United States Patent [19]
Pianka

[11] 3,711,578
[45] Jan. 16, 1973

[54] (N-ALKOXYCARBONYL-N-ALKYLCARBAMOYL) DIALKYL PHOSPHONO-THIOATES AND THIOLOTHIONATES

[75] Inventor: Max Pianka, St. Albans, England

[73] Assignee: The Murphy Chemical Company Limited, Albans, England

[22] Filed: July 8, 1969

[21] Appl. No.: 840,063

[30] Foreign Application Priority Data

July 15, 1968 Great Britain.....................33,690/68

[52] U.S. Cl................260/942, 260/927 R, 260/938, 260/971, 260/979, 424/211
[51] Int. Cl..........................C07f 9/40, A01n 9/36
[58] Field of Search............................260/938, 942

[56] References Cited

UNITED STATES PATENTS

| | | | |
|---|---|---|---|
| 3,420,918 | 1/1969 | Fancher et al. | 260/938 |
| 3,517,089 | 6/1970 | Newallis et al. | 260/942 |

OTHER PUBLICATIONS

Pinka, "Chemistry and Industry", March 11, 1961, p. 324

*Primary Examiner*—Lewis Gotts
*Assistant Examiner*—Anton H. Sutto
*Attorney*—Bacon and Thomas

[57] ABSTRACT

Organo-phosphonates, -phosphonothioates and -phosphonothiolothionates having inter alia insecticidal, acaricidal and nematicidal activities.

17 Claims, No Drawings

(N-ALKOXYCARBONYL-N-ALKYLCARBAMOYL) DIALKYL PHOSPHONO-THIOATES AND THIOLOTHIONATES

This invention is concerned with new chemical compounds having useful insecticidal and acaricidal properties, and to preparations containing them.

According to the invention there are provided compounds of the formula:

$$X{=}\overset{OR^1}{\underset{R}{P}}{-}Y{-}CH_2{\cdot}CO{\cdot}NR^2{\cdot}CO_2R^3 \qquad I$$

in which R and $R^1$, which can be the same or different, are aliphatic groups having one to four carbon atoms, or aromatic groups, $R^2$ is a hydrogen atom or an aliphatic group having one to four carbon atoms, $R^3$ is an aliphatic, preferably alkyl or alkenyl group having one to 10 carbon atoms, and X and Y, which can be the same or different, are oxygen or sulphur atoms.

The groups R, $R^1$, $R^2$ may be saturated or unsaturated groups, e.g., alkoxyalkyl, alkyl, alkenyl, haloalkyl or alkylthioalkyl groups. Methyl and ethyl groups are particularly preferred. Other groups include propyl, isopropyl, butyl, ethoxyethyl, methoxyethyl, allyl, and 2-chloroethyl.

Where R and/or $R^1$ is aromatic it may be a phenyl group or a phenyl group substituted with, for example, lower alkyl or halogen.

The group $R^3$ may be a methyl, ethyl, n-propyl, isopropyl, butyl, pentyl etc. group. $R^3$ may be alternatively an alkenyl, alkynyl, alkoxyalkyl, or alkylthioalkyl group.

Compounds of formula I wherein X and Y are different and the other variables are otherwise identical can of course exist in isomeric forms, the O:P.S and S:P.O forms. Reference to either form herein should be construed to refer to the other form as well.

The compounds according to the invention possess very interesting biological activity especially in comparison with organophosphate pesticides. Thus they are highly active by soil application. They are highly active against *Plutella maculipennis*, *Sitophilus granarius* (grain weevil), and against *Myzus persicae*. (*Myzus persicae* is a green sucking aphis, which infests sugar beet and potato plants and acts as a vector of virus yellow in sugar beet and various virus diseases in potato, causing a weakening of the infected plant.) Some of the compounds according to the invention are exceptionally active against spider mites (*T. telarius*) which are resistant to organophosphate miticides.

In general, the compounds according to the invention have better activities than the corresponding phosphates, and some of the compounds have much better activities. The compounds, while being biodegradable, in general are longer lasting than the corresponding phosphates.

S-(N-methoxycarbonyl-N-methylcarbamoyl-methyl)dimethylphosphonothiolothionate was found to possess an acute oral toxicity ($LD_{50}$) of 57 mg/kg. in rats, and a favorable ratio of insecticidal activity to mammalian toxicity.

The compounds according to the invention can be prepared by any convenient method. According to one feature of the invention, there is provided a process for the preparation of a compound of the formula I above which comprises reacting a compound of the formula $$X{=}\overset{OR^1}{\underset{R}{P}}{-}Y{-}Q \qquad II$$

in which R, $R^1$, X and Y are as hereinbefore defined, and Q represents a hydrogen atom, an alkali metal, ammonium, or an organic cation, with an N-haloacetyl-carbamate of the formula $$Hal{\cdot}CH_2{\cdot}CO{\cdot}NR^2CO_2R^3 \qquad III$$

in which $R^2$ and $R^3$ are as hereinbefore defined, and Hal represents a halogen atom, i.e. chlorine, bromine, or iodine, the process being carried out in the presence of an acid binding agent when Q represents a hydrogen atom.

Suitable acid binding agents are, for example, alkali metal carbonates such as sodium or potassium carbonate, and tertiary organic bases such as pyridine and triethylamine. The reaction may, if desired, be carried out in a solvent medium. Suitable solvents are water, ketones, e.g. acetone, methylethylketone, and methylisobutylketone, dioxan, alcohols, e.g. methanol, ethanol and isopropanol, ethers e.g. diethyl ether and diisopropyl ether, hydrocarbon solvents, e.g. petroleum ether, benzene and toluene, halogenated hydrocarbon solvents, e.g. chloroform, carbon tetrachloride, methylene dichloride and chlorobenzene, and amide and nitrile solvents, e.g., dimethylformamide, dimethylacetamide, and acetonitrile.

Preferably an alkali metal, e.g., sodium or potassium, or ammonium salt of the formula II is reacted with an N-chloroacetyl-carbamate of III.

The compounds of the formula II can be prepared according to methods described in the literature, for example according to Chupp and Newallis, *J. Org. Chem.*, (1962) 27, p. 3832, British Patent Specification No. 912,747 and Hoffmann, Kagan and Carfield, *J.A.C.S.*, (1959) 81, p. 148.

According to a further feature of the invention, there is provided a process for the preparation of compounds of the formula I (hereinbefore defined) in which X and Y both represent sulphur atoms which comprises reacting a compound of the formula $$\begin{array}{c} S \\ \| \\ R{-}P{-}S \\ | \quad | \\ S{-}P{-}R \\ \| \\ S \end{array} \qquad IV$$

in which R is as hereinbefore defined with an N-haloacetyl-carbamate of the formula III above in the presence of an alcohol $R^1OH$ (in which $R^1$ is as hereinbefore defined) and an acid binding agent.

The reaction is preferably effected in the presence of a solvent, which is conveniently an excess of the alcohol $R^1OH$.

The acid binding agent is preferably an alkali metal carbonate, such as sodium or potassium carbonate, or a tertiary organic base, such as pyridine or triethylamine.

Generally, it will be convenient to effect the reaction according to the invention at or around ambient temperature. If desired temperatures ranging from 0° to 100° C may be used care being taken to prevent decomposition or rearrangement of the reactants or final product.

The compounds according to the invention can be formulated for use in any desired way. Generally such formulations will include the pesticidal compound or toxicant in association with a suitable carrier or diluent. Such carriers may be liquid or solid and designed to aid the application of the toxicant either by way of dispersing it wherein it is applied or to provide a formulation which can be made by the user into a dispersible preparation.

Liquid preparations thus include preparations of the toxicant in the form of solutions or emulsions which can be used on their own or be adapted to be made up with water or other diluents to form sprays etc; in such cases the carrier is a solvent or emulsion base non-phytotoxic under the condition of use. Generally such preparations will include a wetting, dispersing or emulsifying agent. Other liquid preparations include aerosols in which the toxicant is in association with a liquid carrier or propellant.

Solid preparations include dusts and wettable powders, granulates and pellets, and semi-solid preparations such as pastes. Such preparations may include inert solid or liquid diluents such as clays, which may themselves have wetting properties, and/or wetting, dispersing or emulsifying agents; binding and/or adhesive agents may also be included. Solid preparations also include thermal fumigating compositions wherein the toxicant is associated with a solid pyrotechnic component.

The compounds according to the invention may be used, if desired, in admixture with compatible insecticides and/or fungicides.

For the better understanding of the invention, the following examples are given by way of illustration only. In these examples temperatures are given in degrees centigrade, and parts, unless otherwise stated are by weight. Where parts by weight and parts by volume are mentioned together these are to be taken as having the relationship of grams to ccs.

EXAMPLE 1

S-(N-Methoxycarbonyl-N-methylcarbamoylmethyl) dimethylphosphonothiolothionate

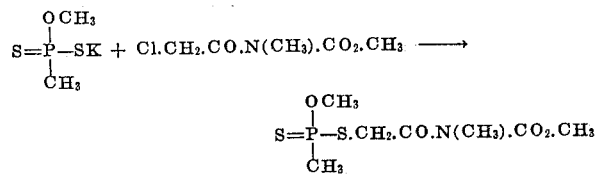

Potassium dimethylphosphonothiolothionate (30 g., 0.165 mole, m.p. 180°), in acetone (140 ml.), was added to a solution of methyl N-chloroacetyl-N-methyl-carbamate (24.9 g., 0.15 mole) in acetone (40 ml.). The reaction was slightly exothermic. The reaction mixture was left to stand at room temperature for 1 day, potassium chloride (11.2 g., theory = 11.21 g.) was filtered off, and the filtrate distilled at 10 – 20 mm. on a steam-bath. The residue was dissolved in ether and washed with water. The ether solution was dried ($Na_2SO_4$) and distilled at 0.8 mm. at room temperature to leave a white oil (38.95 g., 95.9%), $n_D^{20}$ 1.5485 (Found: N, 5.3; P, 11.25; S, 23.6. $C_7H_{14}NPO_4S_2$ requires N, 5.16; P, 11.44; S, 23.6%). It distilled at 172°–174°/2.5 mm., $n_D^{20}$ 1.5475.

EXAMPLE 2

S-(N-Methoxycarbonyl-N-methylcarbamoylmethyl) dimethylphosphonothiolothionate

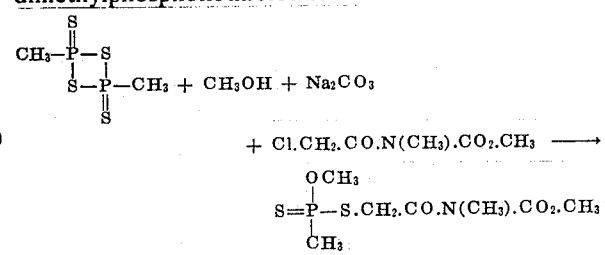

Methyl thionophosphine sulphide (11.0 g., 0.01 mole), prepared by the method of P.E. Newallis, J.P. Chupp, and L.C.D. Groenweghe, *J. Org. Chem.*, (1962) 27, 3829, was allowed to dissolve in methanol (30 ml.) (this reaction is exothermic). To the resulting solution was added anhydrous sodium carbonate (5.3 g., 0.1 equiv.). There was a vigorous evolution of carbon dioxide. A solution of methyl N-chloroacetyl-N-methyl-carbamate (15.7 g., 0.095 mole), in acetone (20 ml.), was added and the mixture refluxed for 30 min. The precipitated solid was filtered off and the filtrate refluxed for a further 30 min. There was no further precipitation of solid. The methanol and acetone were distilled off and the residue was dissolved in ether and washed with 0.5N sodium carbonate solution and then with water. The ether solution was separated and dried ($Na_2SO_4$). The dried solution was distilled at 2 mm. and room temperature to leave a yellow oil (24.05 g., 93.4%), $n_D^{20}$ 1.5460.

EXAMPLE 3

S-(N-Methoxycarbonyl-N-methylcarbamoylmethyl) O-methyl ethylphosphonothiolothionate

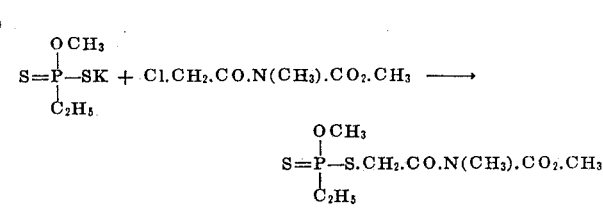

This compound, which was prepared by the method of Example 1 except that potassium O-methyl ethylphosphonothiolothionate was used, distilled at 151°/0.65 mm., $n_D^{20}$ 1.5438 (Found: S, 22.3. $C_8H_{16}NO_4PS_2$ requires S, 22.45%).

EXAMPLE 4

S-(N-Ethoxycarbonyl-N-methylcarbamoylmethyl) methyl ethylphosphonothiolothionate

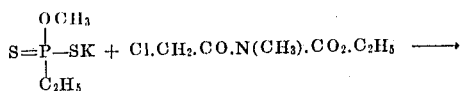

$$S=\overset{OCH_3}{\underset{C_2H_5}{\overset{|}{P}}}-SK + Cl\cdot CH_2\cdot CO\cdot N(CH_3)\cdot CO_2\cdot C_2H_5 \longrightarrow$$

$$S=\overset{OCH_3}{\underset{C_2H_5}{\overset{|}{P}}}-S\cdot CH_2\cdot CO\cdot N(CH_3)\cdot CO_2\cdot C_2H_5$$

This compound, which was prepared by the method of Example 3 except that ethyl N-chloroacetyl-N-methyl-carbamate was used, distilled at 144°/0.3 mm., $n_D^{20}$ 1.5340 (Found: S, 21.5 $C_9H_{18}NO_4PS_2$ requires S 21.4%).

EXAMPLE 5

S-(N-Ethoxycarbonyl-N-methylcarbamoylmethyl) O-ethyl methylphosphonothiolothionate

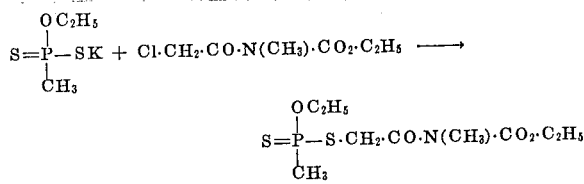

This compound, which was prepared by the method of Example 4 except that potassium O-ethyl methylphosphonothiolothionate was used, distilled at 138° – 139°/0.25 mm., $n_D^{20}$ 1.5300 (Found: S, 21.3. $C_9H_{18}NO_4PS_2$ requires S, 21.4%)

EXAMPLE 6

S-(N-Ethoxycarbonyl-N-methylcarbamoylmethyl) diethyl phosphonothiolothionate

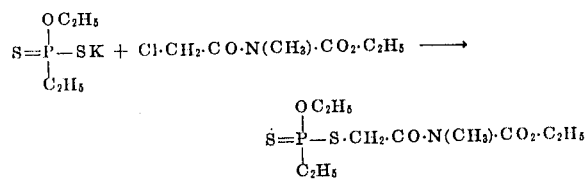

This compound, which was prepared by the method of Example 4 except that potassium diethylphosphonothiolothionate was used and the mixture was refluxed for 4 hours, distilled at 145° – 146°/0.35 mm., $n_D^{20}$ 1.5270 (Found: S, 20.47. $C_{10}H_{20}NO_4PS_2$ requires S, 20.45%).

EXAMPLE 7

S-(N-Ethoxycarbonyl-N-ethylcarbamoylmethyl) diethyl phosphonothiolothionate

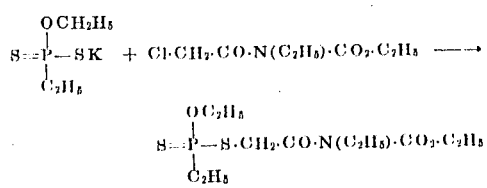

This compound, which was prepared by the method of Example 6 except that ethyl N-chloroacetyl-N-ethyl-carbamate was used, distilled at 144°/0.25 mm., $n_D^{20}$ 1.5215 (Found: S, 19.8. $C_{11}H_{22}NO_4PS_2$ requires S, 19.6%).

EXAMPLE 8

S-(N-Methoxycarbonyl-carbamoylmethyl) dimethyl phosphonothiolothionate

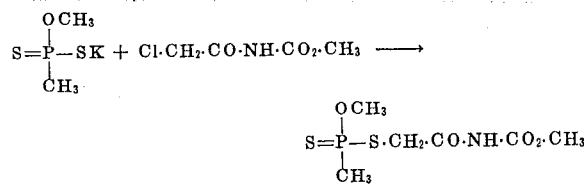

This compound was prepared from potassium dimethyl phosphonothiolothionate and methyl N-chloroacetyl-carbamate using the conditions described in Example 1. To the oil obtained after the acetone was removed ether was added, then water, then chloroform. The aqueous layer was separated off and the chloroform solution was dried over sodium sulphate. On removal of the chloroform a solid remained. The compound was obtained as white plates, m.p. 108.5° – 109.5°(from toluene) Found: P, 12.0. $C_6H_{12}NO_4PS_2$ requires P, 12.0%).

EXAMPLE 9

(N-Methoxycarbonyl-N-methylcarbamoylmethyl) dimethylphosphonothioate

Potassium dimethylphosphonothioate (6.9 g., 0.042 mole), in acetone (30 ml.), was mixed with methyl N-chloro-acetyl-N-methyl-carbamate (6.62 g., 0.04 mole), in acetone (10 ml.). The mixture was allowed to stand at room temperature for 3 days. The solid (2.97 g., theory for potassium chloride 2.98 g.) was filtered off and the filtrate was heated at 10 - 20 mm. on a steam bath. The residue was dissolved in chloroform and washed with a little water. The chloroform solution was separated, dried ($Na_2SO_4$), and heated at 20°/ 2 mm. to leave a brown oil (9.6 g.) which was distilled. The compound boiled at 144° – 146°/0.5 mm., $n_D^{20}$ 1.5080 (Found: S, 12.1. $C_7H_{14}NO_5PS$ requires S, 12.55%).

EXAMPLE 10

(N-Ethoxycarbonyl-N-methylcarbamoylmethyl) O-ethyl methylphosphonothioate

This compound, which was prepared by the method of Example 1 except that potassium O-ethyl methylphosphonothioate and ethyl N-chloroacetyl-N-methyl-carbamate were used, distilled at 139°/0.3 mm., $n_D^{20}$ 1.4958 (Found:S, 11.1. $C_9H_{18}NO_5PS$ requires S, 11.3%).

EXAMPLE 11

(N-Ethoxycarbonyl-N-methylcarbamoylmethyl) O-methyl ethylphosphonothioate

This compound, which was prepared by the method of Example 1 except that potassium O-methyl ethylphosphonothioate and ethyl N-chloroacetyl-N-methyl-carbamate were used, distilled at 140°/0.25 mm., $n_D^{20}$ 1.4990 (Found: S, 11.3. $C_9H_{18}NO_5PS$ requires S, 11.3%).

EXAMPLE 12

(N-Methoxycarbonyl-N-methylcarbamoylmethyl) diethyl phosphonothioate

Methyl N-chloroacetyl-N-methyl-carbamate (20.7 g., 0.125 mole), in acetone (50 ml.), was added to a solution of potassium O-ethyl ethylphosphonothioate (24.0 g., 0.125 mole), in acetone (200 ml.). There was immediate precipitation of potassium chloride. The mixture was refluxed for 4½ hr. on a steam bath and filtered. The acetone was distilled off at 50° – 60° under reduced pressure, and the residual oil dissolved in benzene (100 ml.). The benzene solution was washed with 2N sodium carbonate (20 ml.), then 1 percent sodium chloride solution (20 ml.), dried over anhydrous sodium sulphate, and the benzene distilled off under reduced pressure at 50° – 60°. The residual oil weighed 33.2 g. (94 percent yield). It distilled at 140°/0.3 mm., $n_D^{20}$ 1.4985 (Found: S, 11.3. $C_9H_{18}NO_5PS$ requires S, 11.3%).

EXAMPLE 13

(N-Ethoxycarbonyl-N-methylcarbamoylmethyl) diethylphosphonothioate

This compound, which was prepared by the method of Example 1 except that potassium diethylphosphonothioate and ethyl N-chloroacetyl-N-methyl-carbamate were used, distilled at 142°/0.3 mm., $n_D^{20}$ 1.4930 (Found: S, 10.76. $C_{10}H_{20}NO_5PS$ requires S, 10.77%).

The following compounds were prepared according to the method of Example 1, using the appropriate starting materials:

| Example number | Compound | B.p./mm. | $n_D^{20}$ | Molecular Formula | Analysis Found P | Analysis Found S | Analysis Required P | Analysis Required S |
|---|---|---|---|---|---|---|---|---|
| 14 | S-(N-Methoxycarbonyl-N-ethylcarbamoylmethyl) dimethylphosphonothiolothionate | 139–140°/0.3 | 1.5385 | $C_8H_{16}NO_4PS_2$ | | 22.65 | | 22.46 |
| 15 | (N-Methoxycarbonyl-N-ethylcarbamoylmethyl) dimethylphosphonothioate | 135–136°/0.3 | 1.4999 | $C_8H_{16}NO_5PS$ | | 12.00 | | 11.90 |
| 16 | S-(N-Ethoxycarbonyl-N-methylcarbamoylmethyl) dimethylphosphonothiolothionate | 139–140°/0.2 | 1.5368 | $C_8H_{16}NO_4PS_2$ | | 22.25 | | 22.46 |

| Example number | Compound | B.p./mm. | $n_D^{20}$ | Molecular Formula | Analysis Found P | Analysis Found S | Analysis Required P | Analysis Required S |
|---|---|---|---|---|---|---|---|---|
| 17 | S-(N-Methoxycarbonyl-N-methylcarbamoylmethyl) O-propyl ethylphosphonothiolothionate | 152–3°/0.3 | 1.5305 | $C_{10}H_{20}NO_4PS_2$ | | 20.45 | | 20.45 |
| 18 | S-(N-Ethoxycarbonyl-N-methylcarbamoylmethyl) O-propyl ethylphosphonothiolothionate | 151–2°/0.15 | 1.5221 | $C_{11}H_{22}NO_4PS_2$ | | 19.43 | | 19.57 |
| 19 | S-(N-Methoxycarbonyl-N-methylcarbamoylmethyl) O-butyl ethylphosphonothiolothionate | 160–1°/0.3 | 1.5256 | $C_{11}H_{22}NO_4PS_2$ | | 19.79 | | 19.57 |
| 20 | S-(N-Ethoxycarbonyl-N-methylcarbamoylmethyl) O-butyl ethylphosphonothiolothionate | 161–2°/0.2 | 1.5188 | $C_{12}H_{24}NO_4PS_2$ | | 18.78 | | 18.77 |
| 21 | S-(N-Methoxycarbonyl-N-methylcarbamoylmethyl) O-allyl ethylphosphonothiolothionate | 158–9°/0.25 | 1.5418 | | 10.0 | | 10.0 | |
| 22 | S-(N-Ethoxycarbonyl-N-methylcarbamoylmethyl) O-allyl ethylphosphonothiolothionate | 161–2°/0.2 | 1.5319 | | | 19.8 | | 19.7 |
| 23 | (N-Methoxycarbonyl carbamoylmethyl) dimethylphosphonothioate | M.p. 144–6° | Off-white prisms (from acetone) | $C_6H_{12}NO_5PS$ | 12.90 | | 12.86 | |
| 24 | S-(N-Methoxycarbonyl-N-methylcarbamoylmethyl) O-2-chloroethyl ethylphosphonothiolothionate | | 1.5461 | | | 19.8 | | 19.2 |

| Example No. | Name of Compound | B.p./mm. | $n_D^{20}$ | Molecular Formula | Analysis Found (%) P | Analysis Found (%) S | Analysis Required (%) P | Analysis Required (%) S |
|---|---|---|---|---|---|---|---|---|
| 25 | S-(N-Ethoxycarbonyl-N-methylcarbamoylmethyl) O-2-chloroethyl ethylphosphonothiolothionate | | 1.5329 | | | 18.3 | | 18.4 |
| 26 | (N-Methoxycarbonylmethyl)carbamoylmethyl) diethylphosphonothioate | | 1.5039 red oil | $C_8H_{16}NO_5PS$ | 11.7 | 11.9 | 11.5 | 11.9 |
| 27 | (N-Methoxycarbonyl-N-methylcarbamoylmethyl) O-ethyl methylphosphonothioate | 134-135°/0.3 | 1.4998 | $C_8H_{16}NO_5PS$ | | 23.0 | | 22.5 |
| 28 | S-(N-Methoxycarbonylmethyl)carbamoylmethyl) O-propyl methylphosphonothiolothionate | M.p. 75-76° (pale brown needles from propan-2-ol) | | $C_8H_{16}NO_4PS_2$ | | 22.0 | | 21.4 |
| 29 | S-(N-Methoxycarbonyl-N-methylcarbamoylmethyl) O-propyl methylphosphonothiolothionate | 140-141°/0.25 | 1.5350 | $C_9H_{18}NO_4PS_2$ | | 21.1 | | 21.4 |
| 30 | S-(N-Methoxycarbonyl-N-methylcarbamoylmethyl) diethylphosphonothiolothionate | 154°/0.4 | 1.5360 | $C_9H_{18}NO_4PS_2$ | | 19.3 | | 19.6 |
| 31 | S-(N-Methoxycarbonyl-N-methylcarbamoylmethyl) dipropylphosphonothiolothionate | | 1.5239 (brown oil) | $C_{11}H_{22}NO_4PS_2$ | | 17.7 | | 18.0 |
| 32 | S-(N-Methoxycarbonyl-N-methylcarbamoylmethyl) dibutylphosphonothiolothionate | 152°/0.05 | 1.5205 | $C_{13}H_{26}NO_4PS_2$ | | | | |
| 33 | S-(N-Allyloxycarbonyl-N-methylcarbamoylmethyl) diethylphosphonothiolothionate | 158-159°/0.3 | 1.5349 | $C_{11}H_{20}NO_4PS_2$ | 9.4 | | 9.5 | |

| Example No. | Name of Compound | B.p./mm. | $n_D^{20}$ | Molecular Formula | Analysis Found (%) | | Analysis Required (%) | |
|---|---|---|---|---|---|---|---|---|
| | | | | | P | S | P | S |
| 34 | S-(N-hexyloxycarbonyl-N-methylcarbamoylmethyl) diethylphosphonothiolothionate | 178–179.5°/0.3 | 1.5124 | $C_{14}H_{28}NO_4PS_2$ | 8.2 | | 8.4 | |
| 35 | S-(N-Methoxycarbonyl-carbamoyl-methyl) O-methyl/phenyl-phosphonothiolothionate | | 1.6040 (brown oil) | $C_{11}H_{14}NO_4PS_2$ | 9.7 | | 9.7 | |
| 36 | S-(N-Ethoxycarbonyl-carbamoyl-methyl) O-methyl phenylphosphonothiolothionate | | 1.5895 (brown oil) | $C_{12}H_{16}NO_4PS_2$ | 9.3 | | 9.3 | |
| 37 | S-(N-Methoxycarbonyl-N-methylcarbamoylmethyl) O-methyl phenylphosphonothiolothionate | | 1.5915 (yellow-brown oil) | $C_{12}H_{16}NO_4PS_2$ | 9.4 | | 9.3 | |
| 38 | S-(N-Ethoxycarbonyl-N-methylcarbamoylmethyl) O-methyl phenylphosphonothiolothionate | | 1.5742 (brown oil) | $C_{13}H_{18}NO_4PS_2$ | 9.0 | | 8.9 | |
| 39 | S-(N-Ethoxycarbonyl-N-methylcarbamoylmethyl) O-2-ethoxyethyl ethylphosphonothiolothionate | | 1.5218 | $C_{12}H_{24}NO_5PS_2$ | | 18.3 | | 17.9 |
| 40 | S-(N-Methoxycarbonyl-N-methylcarbamoylmethyl) O-2-ethoxyethyl ethylphosphonothiolothionate | | 1.5289 | $C_{11}H_{22}NO_5PS_2$ | | 18.8 | | 18.7 |
| 41 | S-(N-Methoxycarbonyl-N-methylcarbamoylmethyl) di-isopropyl phosphonothiolothionate | 149–150°/0.3 | 1.5251 | $C_{11}H_{22}NO_4PS_2$ | 9.8 | | 9.5 | |

| Example No. | Name of Compound | B.p./mm. | $n_D^{20}$ | Molecular Formula | Found (%) P | Found (%) S | Required (%) P | Required (%) S |
|---|---|---|---|---|---|---|---|---|
| 42 | S-(N-Methoxycarbonyl-N-methylcarbamoylmethyl)di-s-butyl phosphonothiolothionate | | 1.5205 | $C_{13}H_{26}NO_4PS_2$ | 8.3 | | 8.7 | |
| 43 | S-(N-Methoxycarbonyl-carbamoylmethyl) O-ethyl methylphosphonothiolothionate | M.p.88-88.5° white prisms from propan-2-ol | | $C_7H_{14}NO_4PS_2$ | | 24.0 | | 23.6 |
| 44 | (N-Methoxycarbonyl-N-methylcarbamoylmethyl) O-propyl methylphosphonothioate | 140-142°/0.3 | 1.4957 | $C_9H_{18}NO_5PS$ | | 11.3 | | 11.3 |
| 45 | S-(N-Methoxycarbonyl-carbamoylmethyl dibutylphosphonothiolothionate | M.p.41-45° (white needles from light petroleum bp 40-60°) | | $C_{12}H_{24}NO_4PS_2$ | | 18.5 | | 18.8 |
| 46 | S-(N-Methoxycarbonylcarbamoyl-methyl dipropylphosphonothiolo-thionate | M.p. 73-75° (white plates from light petroleum b.p.40-60°) | | $C_{10}H_{20}NO_4PS_2$ | | 21.6 | | 21.1 |
| 47 | S-(N-Methoxycarbonyl-N-methylcarbamoylmethyl) O-butyl s-butylphosphonothiolothionate | | 1.5206 | $C_{13}H_{26}NO_4PS_2$ | | 17.6 | | 18.0 |
| 48 | S-(N-Methoxycarbonyl-N-methylcarbamoylmethyl) O-isopropyl propylphosphonothiolothionate | 160°/0.5 mm. | 1.5295 | $C_{11}H_{22}NO_4PS_2$ | | 20.5 | | 19.6 |
| 49 | S-(N-Methoxycarbonyl-N-methylcarbamoylmethyl) O-propyl isopropyl-phosphonothiolothionate | | 1.5298 (yellow oil) | $C_{11}H_{22}NO_4PS_2$ | | 20.2 | | 19.6 |
| 50 | (N-Methoxycarbonyl-N-methylcarbamoylmethyl) O-propyl isopropyl-phosohonothioate | | 1.4936 (yellow oil) | $C_{11}H_{22}NO_5PS$ | 10.3 | | 10.0 | |
| 51 | (N-Ethoxycarbonyl-carbamoylmethyl) O-propyl isopropyl-phosohonothioate | | 1.4928 (orange oil) | $C_{11}H_{22}NO_5PS$ | 10.0 | | 10.0 | |

Formulation

The products of the Examples were formulated as emulsifiable concentrates in several ways, viz:

1. 4 parts of the toxicant were mixed with 10 parts of Lissapol NX (a polyethylene glycol ether) and made up to 100 parts by volume with acetone.

2. 25 parts of the toxicant, 4 parts of the calcium salt of dodecyl benzene sulphonate and 4 parts of a nonionic emulsifier were made up to 100 parts by volume with heavy naphtha.

3. 80 parts of the toxicant and 20 parts of a blend of non-ionic and anionic emulsifiers, Agrilan A, sold by Lankro Chemicals Limited were made up to 100 parts by volume with butanol.

All these formulations were made up to the required concentrations with water.

A formulation in the form of granules was prepared as follows:

5 g of the toxicant was suspended in 7g of diacetone alcohol, and this was intimately mixed with 87 g of Fullers Earth granules having a diameter between 353 and 840 microns. The granules could be applied directly to the soil.

Biological results

Test of systemic activity against aphis by soil application

The formulation of the toxicant as an emulsifiable concentrate was diluted with water to give 500 ppm of the toxicant. 20 ml. of this solution was pipetted on to the soil around the base of broad bean plants growing in a 7.5cm pot. The plant was infested with *Aphis fabae* and assessment of the kill was made 48 hours after infestation. In this case the plants were infested directly after the application of the toxicant and counted 2 days later. Another set of plants was infested 3 days after treatment with the toxicant and counted 48 hours later. Yet another set was infested 5 days after treatment with the toxicant and counted 48 hours later. The results are shown in Table 1.

Further tests for systemic activity against aphids

1. Control of black and green aphid on rice plants

The active ingredient (compound of Examples 1 and 2) was applied as a soil drench, in the form of an emulsifiable concentrate. The results were as follows:

| Rate of application (kg/ha) | % control |
|---|---|
| 2.24 | 95% in 24 hours |
|  | 100% in 48 hours |
|  | Reinfested 1 week after treatment |
|  | 90% control in 24 hours. |
| 0.56 | 90% in 24 hours |
|  | 98% in 48 hours |
|  | 100% in 6 days |

2. Control of green aphid on tobacco plants

The compound of Examples 1 and 2 was applied as a granular formulation which was raked into the sandy loam soil. The results were as follows:

| Rate of application (kg/ha) | % control after 5 weeks |
|---|---|
| 8.96 | 100 |
| 4.48 | 100 |

The plants were reinfested with aphids throughout the test. There was no phytotoxicity to the tobacco plants.

3. Control of green aphid on cotton plants

The compound of Examples 1 and 2 was applied as a soil drench prepared from an emulsifiable concentrate. For comparison, phorate was also applied. The results were as follows:

| Rate of application (kg/ha) | No. of live aphids/per plant after | | | |
|---|---|---|---|---|
|  | 7 | 10 | 16 | 20 days |
| 2.24 | 30 | 8 | 0 | 1 |
| 1.12 | 3 | 21 | 0 | 1 |
| 0.84 | 47 | 30 | 3 | 4 |
| phorate 2.24 | 12 | 25 | 24 | 9 |
| phorate 1.12 | 75 | 105 | 60 | 95 |
| Untreated control | 90 | 125 | 80 | 125 |

TABLE 1.—APHIS FABAE SYSTEMIC TEST

| Compound of example number | Rate of application | Percent control after— | | | Rate of application | Percent control with dimefox | | |
|---|---|---|---|---|---|---|---|---|
|  |  | 2 days | 5 days | 7 days |  | 2 days | 5 days | 7 days |
| 1 and 2 | 500 p.p.m | 97 | 100 | 100 | 500 p.p.m | 98 | 100 | 56 |
| 1 and 2 | 250 p.p.m | 100 | 100 | 99 | 250 p.p.m | 99 | 14 | 0 |
| 3 | 500 p.p.m | 100 | 100 | 100 |  |  |  |  |
| 4 | 250 p.p.m | 95 | 100 | 95 |  |  |  |  |
| 5 | 250 p.p.m | *67 | 91 | 97 |  |  |  |  |
| 6 | 500 p.p.m | 93 | 100 | 99 | 500 p.p.m | 98 | 100 | 56 |
| 6 | 250 p.p.m | 98 | 90 | 97 | 250 p.p.m | 99 | 48 | 0 |
| 7 | 250 p.p.m | 95 | 99 | 97 |  |  |  |  |
| 8 | 250 p.p.m | 99 | 98 | 99 |  |  |  |  |
| 9 | 250 p.p.m | 100 | 100 | 97 | 250 p.p.m | 99 | 48 | 0 |
| 10 | 250 p.p.m | 100 | 100 | 100 | 250 p.p.m | 99 | 48 | 0 |
| 11 | 250 p.p.m | 99 | 92 | 91 | 250 p.p.m | 100 | 72 | 28 |
| 12 | 250 p.p.m | 100 | 100 | 100 | 250 p.p.m | 99 | 14 | 0 |
| 12 | 100 p.p.m | 100 | 99 | 100 | 100 p.p.m | 2 | 6 | 100 |
| 13 | 250 p.p.m | 99 | 100 | 100 | 250 p.p.m | 53 | 2 | 0 |
| 14 | 250 p.p.m | 85 | 100 | 100 | 250 p.p.m | 58 | 29 | 3 |
| 15 | 250 p.p.m | 99 | 100 | 99 | 250 p.p.m | 58 | 29 | 3 |
| 16 | 250 p.p.m | 93 | 100 | 76 | 250 p.p.m | 58 | 29 | 3 |
| 17 | 250 p.p.m | 85 | 100 | 99 | 250 p.p.m | 58 | 29 | 3 |
| 18 | 250 p.p.m | *26 | 100 | 37 | 250 p.p.m | 97 | 33 | 4 |
| 21 | 250 p.p.m | *69 | 99 | 92 | 250 p.p.m | 97 | 72 | 1 |
| 23 | 250 p.p.m | 100 | 100 | 97 | 250 p.p.m | 97 | 33 | 4 |
| 26 | 250 p.p.m | 100 | 100 | 100 | 250 p.p.m | 96 | 60 | 27 |
| 27 | 100 p.p.m | 100 | 100 | 100 | 250 p.p.m | 97 | 67 | 65 |
| 28 | 100 p.p.m | 100 | 100 | 100 | 250 p.p.m | 100 | 67 | 65 |
| 28 | 250 p.p.m | 98 | 100 | 99 | 250 p.p.m | 24 | 34 | 12 |
| 28 | 3.36 kg./ha | 86 | 100 | 100 | 3.36 kg./ha | 0 | 74 | 58 |
| 33 | 250 p.p.m | 96 | 99 | 84 | 250 p.p.m | 97 | 72 | 1 |
| 34 | 250 p.p.m | *1 | 100 | 100 | 250 p.p.m | 97 | 67 | 57 |

*Slow acting compounds.

The plants were reinfested with aphids throughout the test. There was no phytotoxicity to the cotton plants.

Test for activity against Aphis fabae by contact application

The host plant was again the broad bean, *Vicia faba*. A formulation of the toxicant was diluted with water to give concentrations of toxicant of 100, 30, 10, 3 and 1 ppm and was applied to the plants by a dipping technique. The percentage control of aphids was assessed 48 hours after treatment. For comparison purposes, parallel tests were run using γ-benzene hexachloride.

The results are shown in Table 2.

TABLE 2 — *APHIS FABAE* CONTACT TEST

| Compound of Example No. | % control | | | | | % control with Gamma-BHC | | |
|---|---|---|---|---|---|---|---|---|
| | 100 ppm | 30 ppm | 10 ppm | 3 ppm | 1 ppm | 100 ppm | 30 ppm | 10 ppm |
| 1 and 2 | 99+ | 99 | 96 | | | | | |
| 41 | | | | | 3 | 99 | 65 | 45 |
| 3 | 100 | 99 | 94 | | | | | |
| 61 | | | | | 16 | | | |
| 4 | | | 83 | 21 | 31 | | | |
| 5 | | | 72 | 48 | 7 | | | |
| 6 | 100 | 100 | 100 | 70 | 68 | | | |
| 7 | 98 | 89 | 65 | | | | | |
| 9 | | | 99 | 60 | 59 | | | |
| 10 | | | 100 | 99 | 62 | | | |
| 11 | | | 99 | 70 | 49 | | | |
| 12 | 100 | 100 | 100 | 100 | 67 | | | |
| 13 | 100 | 100 | 89 | | | | | |
| 92 | | | | | 50 | 91 | 34 | 12 |
| 14 | 100 | 83 | 37 | — | — | 91 | 34 | 12 |
| 15 | 100 | 99 | 86 | — | — | 91 | 34 | 12 |
| 16 | 100 | 96 | 53 | — | — | 91 | 34 | 12 |
| 17 | — | — | 100 | 84 | 26 | 96 | 63 | 4 |
| 18 | 100 | 100 | 91 | — | — | 91 | 34 | 12 |
| 19 | 99 | 89 | 95 | — | — | 91 | 34 | 12 |
| 20 | 99 | 98 | 89 | — | — | 91 | 34 | 12 |
| 22 | 100 | 100 | 88 | — | — | 98 | 14 | 4 |
| 23 | 100 | 100 | 93 | — | — | 91 | 34 | 12 |
| 24 | 99 | 100 | 99 | — | — | 98 | 14 | 4 |
| 25 | 100 | 96 | | — | — | 98 | 14 | 4 |
| 26 | 100 | 100 | 97 | — | — | 99 | 33 | 6 |
| 27 | | | 100 | 99 | 99 | 99 | 60 | 9 |
| 28 | 100 | 100 | 100 | 99 | 70 | 99 | 60 | 9 |
| 29 | 100 | 100 | 99 | — | — | 82 | 34 | 6 |
| 30 | 100 | 100 | 94 | — | — | 100 | 95 | 15 |
| 31 | 100 | 100 | 100 | — | — | 100 | 100 | 65 |
| 33 | 100 | 100 | 93 | — | — | 98 | 14 | 4 |
| 34 | 100 | 100 | 99 | — | — | 98 | 14 | 4 |
| 39 | 98 | 66 | 70 | — | — | 99 | 33 | 6 |

Test for activity against *Myzus persicae* by contact application

The *Myzus persicae* used were resistant to dimethoate. A formulation of the toxicant was diluted with water to give concentrations of toxicant of 100, 30, 10, 3 and 1 ppm and was applied to the plants (rape: *Brassica napus*) by a dipping technique. The percentage control was assessed after 24 hours. γ-Benzene hexachloride was again employed for comparison purposes.

The results are shown in Table 3, which also includes results for demeton-methyl, dimethoate and malathion.

TABLE 3 — MYZUS PERSICAE CONTACT TEST

| Compound of Example No. | % control | | | | % control with Gamma-BHC | | |
|---|---|---|---|---|---|---|---|
| | 100 ppm | 30 ppm | 10 ppm | 3 ppm | 1 ppm | 100 ppm | 30 ppm | 10 ppm |
| 1 and 2 | 100 | 100 | 58 | — | — | 100 | 73 | 9 |
| 6 | 100 | 100 | 100 | 50 | 25 | 100 | 87 | 22 |
| 12 | 100 | 100 | 57 | — | — | | | |
| 21 | 100 | 100 | 44 | — | — | 100 | 46 | 18 |
| 22 | 100 | 100 | 79 | — | — | 100 | 46 | 18 |
| 24 | 100 | 100 | 96 | — | — | 100 | 46 | 18 |
| 25 | 100 | 100 | 100 | — | — | 100 | 46 | 18 |
| 26 | 100 | 100 | 100 | — | — | 100 | 73 | 9 |
| 27 | 100 | 100 | 100 | 94 | 44 | 100 | 73 | 9 |
| 28 | 100 | 100 | 6 | — | — | 100 | 73 | 9 |
| 29 | 100 | 100 | 100 | — | — | 100 | 73 | 9 |
| 31 | 100 | 100 | 50 | — | — | 100 | 85 | 32 |
| 33 | 100 | 100 | 97 | — | — | 100 | 46 | 18 |
| 34 | 100 | 100 | 100 | 50 | 25 | 100 | 87 | 22 |
| Demeton-methyl | 100 | 24 | 5 | — | — | | | |
| Dimethoate | 69 | — | — | — | — | | | |
| Malathion | 2 | — | — | — | — | | | |

Test for persistance of systemic activity against *Myzus persicae*

The toxicant was applied to the soil in an aqueous dispersion at a concentration of 250 ppm. The host plant was chinese cabbage. *M.persicae* was placed on the plants 1 and 30 days after treatment. For comparison purposes a parallel test was conducted with dimefox. The results are shown in Table 4.

TABLE 4 — *MYZUS PERSICAE* — SOIL PERSISTENCY TEST

| Treatment (compound) | % control days after treatment | |
|---|---|---|
| | 1 | 30 |
| Dimefox | 99 | 7 |
| Examples 1 and 2 | 97 | 76 |
| Example 6 | 91 | 95 |
| Example 7 | - | 100 |
| Example 12 | - | 100 |
| Example 18 | - | 100 |
| Example 44 | - | 100 |

Garden tests for activity against aphids

1. Sugar beet plants were sprayed with an aqueous dispersion of the toxicant containing 200 ppm of the toxicant. The total number of aphids on 6 plants was counted after 5 days and 18 days. The results were as follows:

| Compound | Total no. of aphids on 6 plants after | |
|---|---|---|
| | 5 days | 18 days |
| Examples 1 and 2 | 2 | 2 |
| Example 12 | 0 | 0 |
| Demeton-methyl | 0 | 29 |
| Untreated control | 39 | 57 |

2. Green apples were sprayed with an aqueous dispersion of the compound of Examples 1 and 2 at a concentration of 200 ppm. Complete control of aphids was obtained, while on an untreated control the number of aphids increased by 14 percent in the time between treatment and assessment.

3. The compound of Examples 1 and 2 was tested against *Rhopalosiphum insertum* (pre-blossom aphis on fruit trees); it was employed in a pre-bud break application in an aqueous dispersion at 200 ppm. A test with dimethoate was conducted as a comparison. The results were assessed 5 and 26 days after treatment, and were as follows:

| Compound | % buds infested | | |
|---|---|---|---|
| | pre-treatment | post treatment | |
| | | 5 days | 26 days |
| Examples 1 and 2 | 79 | 7 | 35 |
| Dimethoate | 88 | 40 | 94 |
| Untreated control | 86 | 90 | 95 |

Test for activity against Tetranychus telarius by contact application

Both schradan-resistant and non-resistant strains of *Tetranychus telarius* (red spider) were employed, the host plant being dwarf beans.

The toxicant was applied as an aqueous dispersion by a dipping technique, at concentrations of 100, 30 and 10 ppm. The percentage control effected by each treatment was assessed after 48 hours. Comparative tests were conducted with mecarbam and parathion. The results are shown in Table 5.

TABLE 5 — *TETRANYCHUS TELARIUS* contact test

| Compound of Example No. | % control of non-resistant spider | | | % control of resistant spider | | |
|---|---|---|---|---|---|---|
| | 100 ppm | 30 ppm | 10 ppm | 100 ppm | 30 ppm | 10 ppm |
| 1 and 2 | 100 | 99 | 98 | 100 | 100 | 94 |
| 3 | 100 | 98 | 76 | 63 | 29 | 50 |
| 4 | 100 | 89 | 81 | 96 | 65 | 50 |
| 5 | — | 100 | 100 | 100 | 82 | 78 |
| 6 | 100 | 100 | 93 | 100 | 84 | 44 |
| 7 | 100 | 100 | 100 | 98 | 99 | 65 |
| 8 | 99 | 92 | 66 | 71 | 56 | 45 |
| 9 | 100 | 99 | 100 | 100 | 98 | 93 |
| 10 | 100 | 100 | 98 | — | 100 | 92 |
| 11 | 100 | 91 | 91 | 95 | 77 | 52 |
| 12 | 100 | 100 | 96 | 100 | 98 | 87 |
| 13 | 100 | 95 | 85 | 98 | 75 | 64 |
| 14 | 100 | 98 | 95 | 98 | 95 | 61 |
| 15 | 100 | 100 | 99 | — | 99 | 89 |
| 17 | 98 | 95 | 62 | | | |
| 18 | 99 | 93 | 92 | | | |
| 19 | 100 | 95 | 84 | 91 | 83 | 74 |
| 20 | 96 | 93 | 92 | | | |
| 23 | 99 | 99 | 97 | | | |
| 24 | 99 | 90 | 84 | | | |
| 25 | 99 | 94 | 77 | | | |
| 27 | 100 | 100 | 97 | | | |
| 28 | 100 | 100 | 92 | 100 | 93 | 85 |
| 29 | | | | 94 | 92 | 94 |
| 30 | 97 | 83 | 57 | | | |
| Mecarbam | 93 | 86 | 62 | | | |
| Parathion | — | 78 | — | | | |

In a further series of similar tests designed to compare the activity by contact application of the compound of Examples 1 and 2 with that of known insecticides, the following results were obtained (Table 6):

TABLE 6 — *TETRANYCHUS TELARIUS* CONTACT TEST

| | (%) Control at p.p.m. | | | | | |
|---|---|---|---|---|---|---|
| | Non-resistant spider | | | Resistant spider | | |
| | 100 | 30 | 10 | 100 | 30 | 10 |
| Compound of Examples 1 and 2 | 100 | 96 | 93 | 100 | 100 | 94 |
| Azinphos-methyl | 100 | 95 | 95 | 80 | 58 | 44 |
| Demeton-methyl | 100 | 98 | 97 | 59 | 60 | 44 |
| Dimethoate | | | | 61 | 43 | 42 |
| Malathion | 95 | 95 | 43 | 47 | 32 | 25 |
| Mecarbam | 100 | 96 | 96 | 94 | 63 | 22 |
| Parathion | 91 | 89 | 67 | 43 | 9 | — |
| Phenkapton | 100 | 99 | 99 | 83 | 86 | 74 |
| Schradan | 76 | — | — | 38 | — | — |

Test for systemic activity against Tetranychus telarius

A non-resistant strain of *Tetranychus telarius* was employed; the host plant was the dwarf bean. The plants were infested, and 24 hours later the toxicant was applied to the soil at concentrations of 300, 100, 30 and 10 ppm. The percentage control was assessed 48 hours after treatment. The results were as follows:

| Compound | % control at | | | |
|---|---|---|---|---|
| | 300 | 100 | 30 | 10 ppm |
| Example 15 | — | 100 | 93 | 68 |
| Dimefox | 97 | 90 | 65 | 19 |

Test for activity against Plutella maculipennis by contact application

Rape (*Brassica napus*) was treated by a dipping technique with an aqueous dispersion of the toxicant at concentrations of 100, 30 and 10 ppm. When the plants were dry they were infested with larvae of *P.maculipennis* which accordingly received the toxicant by contact and stomach application.

The percentage control was assessed 48 hours after infestation. The results are shown in Table 7.

TABLE 7 — *PLUTELLA MACULIPENNIS* CONTACT TEST

| Compound of Example No. | % control | | | % control with DDT | | |
|---|---|---|---|---|---|---|
| | 100 ppm | 30 ppm | 10 ppm | 100 ppm | 30 ppm | 10 ppm |
| 1 and 2 | 100 | 100 | — | | | |
| 3 | 100 | 100 | 28 | | | |
| 4 | 100 | 89 | 5 | | | |
| 5 | 100 | 100 | 70 | | | |
| 6 | 100 | 75 | 28 | | | |
| 7 | 90 | 100 | 65 | | | |
| 9 | 94 | 89 | 63 | | | |
| 10 | 100 | 82 | 43 | | | |
| 13 | 98 | 75 | 64 | | | |
| 17 | 95 | 100 | 80 | 95 | 89 | — |
| 18 | 100 | 100 | 100 | 100 | 100 | 80 |
| 19 | 100 | 100 | 85 | 95 | 89 | — |
| 20 | 100 | 100 | 100 | 100 | 100 | 80 |
| 25 | 100 | 94 | 10 | 95 | 26 | — |
| 33 | 100 | 100 | 28 | 95 | 26 | — |

Tests for activity against Coleoptera by contact application

Three species of *Coleoptera-sitophilus granarius*, *Phaedon cochleariae* (mustard beetle adults) and *Tribolium* — were treated with compounds according to the invention at concentrations of 300, 100 and 30 ppm. The toxicant was applied by micrometer syringe. The percentage control was assessed 1 week after treatment in the case of *S.granarius* and 30 days after treatment in the case of *P.Cochleariae* and *Tribolium*. Parallel tests were conducted with mecarbam. The results as shown in Table 8

TABLE 8 — TESTS AGAINST COLEOPTERA

1. *SITOPHILUS GRANARIUS*

| Compound of Example No. | % control | | | % control with mecarbam | | |
|---|---|---|---|---|---|---|
| | 300 ppm | 100 ppm | 30 ppm | 300 ppm | 100 ppm | 30 ppm |
| 1 and 2 | 100 | 92 | 12 | 100 | 76 | — |
| 3 | 100 | | | | | |
| 4 | 100 | | | | | |
| 5 | 100 | | | | | |
| 6 | 100 | 100 | 88 | 100 | 76 | — |

| 11 | 100 | 100 | 96 | 100 | 48 | — |
| 13 | 100 | 100 | 71 | 100 | 33 | — |

2. PHAEDON COCHLEARIAE

| compound of Example No. | % control | | | | % control with mecarbam | |
|---|---|---|---|---|---|---|
| | 300 ppm | 100 ppm | 30 ppm | 10 ppm | 100 ppm | 30 ppm |
| 1 and 2 | 100 | 100 | 20 | 10 | 50 | 70 |
| 5 | 100 | 50 | — | — | 50 | 0 |
| 6 | 100 | 100 | — | — | 50 | 0 |
| 9 | 100 | 100 | — | — | | |
| 10 | 100 | 100 | — | — | | |
| 12 | 100 | 100 | 100 | — | 100 | 30 |
| 13 | 100 | 100 | 40 | 10 | 60 | 10 |
| 21 | 100 | 70 | — | — | 60 | 40 |
| 27 | 100 | 100 | 100 | 90 | 20 | 0 |
| 29 | 100 | 100 | 70 | — | 20 | 0 |

3. TRIBOLIUM

| Compound of Example No. | % control | | | % control with mecarbam | |
|---|---|---|---|---|---|
| | 300 ppm | 100 ppm | 30 ppm | 300 ppm | 100 ppm |
| 1 and 2 | 100 | 88 | 0 | 72 | 64 |
| 3 | 96 | 76 | 16 | 72 | 64 |
| 4 | 96 | 84 | 24 | 72 | 64 |
| 6 | 92 | 80 | 64 | 72 | 64 |
| 9 | 100 | 100 | 88 | 68 | 60 |
| 13 | 100 | 80 | 0 | 48 | 36 |
| 15 | 92 | 84 | 72 | 48 | 20 |
| 17 | 100 | 52 | 0 | 64 | 40 |
| 27 | 100 | 100 | 56 | 48 | 28 |

Tests for activity against *Musca domestica* (house fly) by contact application

The toxicant was applied by micrometer syringe (topical application) at concentrations of 300, 100, 30 and 10 ppm. The percentage control was assessed 48 hours after treatment. The results are shown in Table 9, including the results of parallel tests conducted with mecarbam.

TABLE 9 — MUSCA DOMESTICA CONTACT TEST

| Compound of Example No. | % Control | | | | % control with mecarbam | |
|---|---|---|---|---|---|---|
| | 300 ppm | 100 ppm | 30 ppm | 10 ppm | 100 ppm | 30 ppm |
| 1 and 2 | 100 | 30 | — | — | 25 | — |
| 3 | 100 | 100 | — | — | | |
| 5 | 100 | 0 | — | — | | |
| 8 | 100 | 100 | — | — | 20 | — |
| 9 | — | 100 | 100 | 95 | 90 | 55 |
| 11 | — | 100 | 100 | — | 95 | 60 |
| 12 | — | 100 | 100 | — | 100 | 40 |
| 15 | — | 100 | 100 | — | 45 | 20 |
| 23 | — | 100 | 100 | — | 100 | 75 |
| 27 | — | 100 | 100 | — | 95 | 60 |
| 29 | 100 | 100 | — | — | 100 | 40 |

Test for activity against Dysdercus by contact application

The toxicant was applied to *Dysdercus intermedius* adults by micrometer syringe, at concentration of 100, 30 and 10ppm. The percentage control was assessed after 3 days. Parallel tests were conducted with mecarbam. The results are shown in Table 10.

TABLE 10 — DYSDERCUS CONTACT TEST

| Compound of Example No. | % control | | | % control with mecarbam | |
|---|---|---|---|---|---|
| | 100 ppm | 30 ppm | 10 ppm | 1000 ppm | 300 ppm |
| 1 and 2 | 44 | — | — | — | 100 |
| 6 | 44 | — | — | — | 100 |
| 13 | — | 100 | — | 100 | 89 |
| 15 | — | — | 100 | 100 | 90 |
| 27 | 100 | — | — | 90 | 50 |

Test for activity against Agriotes

The toxicant was applied to dry soil as an aqueous dispersion (5 ppm) and thoroughly mixed therewith. Larvae of Agriotes (wire worms) were then placed in the soil. Parallel tests were conducted with gamma-benzene hexachloride. The percentage control was assessed 4 weeks after treatment, the results are shown in Table 11.

TABLE 11 — WIREWORM (AGRIOTES) TEST

| Compound of Example No. | % control at 5ppm | % control with Gamma-BHC at 5ppm |
|---|---|---|
| 6 | 100 | 87.5 |
| 7 | 100 | 87.5 |
| 17 | 100 | 87.5 |
| 18 | 100 | 87.5 |
| 29 | 100 | 87.5 |

Test for activity against *Pieris brassicae* by contact application

The toxicant prepared in Example 6 was applied to cabbage caterpillar (*P.brassicae*) at a concentration of 250ppm. For comparison purposes, carbaryl at 375 ppm was employed in a parallel test. The number of caterpillars surviving was assessed 3 days after treatment.

| Treatment | Mean no. of caterpillars at 3 days |
|---|---|
| Compound of Example 6 at 250ppm | 2.5 |
| Carbaryl at 375ppm | 10.5 |
| Untreated (control) | 66.75 |

Test for activity against nematodes

The activity of the compound of Examples 1 and 2 was tested against root knot nematodes. The host plants were tobacco and tomato. The toxicant was formulated in two ways - as granules of Fullers earth on which the toxicant, dissolved in diacetone alcohol, was absorbed, and as a corn cob formulation. The formulation of the toxicant was raked into the soil before planting. Except where indicated in the following table, a two week waiting period was allowed before planting. The results were as follows, the Root knot Index being related to a scale on which 0 indicates complete control of nematodes and 5 indicates no control.

| Concentration of active ingredient (kg/ha) | Formulation | Root Knot Index |
|---|---|---|
| 28 | Granules | 0.5 |
| 22.4 | " | 0.0 |
| 11.2 | " | 0.05 |
| 8.96 | " | 0.8 |
| 22.4 | Corn Cob | 0.05 |
| 11.2 | " | 0.0 |
| 8.96 | " | 0.26 |
| 4.48 | " | 0.9 |
| 8.96 | " | 0.7* |
| 4.48 | " | 0.9* |

*no waiting period.

The compound was safe to tobacco plants at 8.96 and 4.48 kg/ha but caused slight tip burn to tomato plants. However, the tomato plants had good size, color and root development. The compound also gave control of aphids on the plants by systemic action.

Further laboratory tests for insecticidal activity

The following test insects were used:
*Boophilus decoloratus* — the blue tick

*Lucilia sericata* — the blow fly responsible for 'strike' in sheep

*Aedes aegypti* — the mosquito vector of yellow fever

*Musca domestica* — the common house fly

Each insect necessitated the use of a different mode of testing, as follows:

1. *Boophilus decolaratus* — blue tick larvae, are held for 24 hours in close contact with a 0.1 percent solution of the substance under test, absorbed on filter paper, after which time mortality is assessed.
2. Two tests are carried out against *Lucilia sericata*, both using 1st instar larvae. In one, an in vitro method, larvae are exposed to a 0.1 percent solution, absorbed on cotton wool rolls, and given horse serum for food, assessment being after 24 hours. The second method entails inducing a flystrike on guinea pigs which are then dosed orally with the compound. Systemic activity is assessed by noting the time taken to repel larvae from the strike.
3. Compounds are screened against immature *Aedes aegypti*; 3rd – 4th instar larvae in water are treated with 10 ppm for 24 hours.
4. Female house flies, (*Musca domestica*,) are used, (the males are more susceptible). These are dosed topically with 1 μl of a 0.1 percent solution. Mortality is assessed after 24 hours.

The results of testing a variety of the compounds of the invention on the four above-mentioned insects are shown in Table 12.

TABLE 12

| Compound of Example No. | Boophilus larvae $LD_{50}$ | Lucilia larvae $LD_{50}$ | Aedes Adults $LD_{50}$ | Aedes larvae $LD_{50}$ | Musca $LD_{50}$ |
| --- | --- | --- | --- | --- | --- |
| 1 | (0.001 % (0.001% (0.001% | (0.0002% (0.0002% (0.0003% | (0.003% (0.004% | 0.07ppm | (0.003% (0.0014% |
| 15 | (0.0006% (0.001% | 0.0004% | 0.02% | <0.16ppm | (0.001% (0.0008% |
| 23 | (0.01% (0.01% | (0.002% (0.002% (0.001% | 0.17% | 0.22ppm | <0.003% |
| 28 | 0.04% | (0.004% (0.004% (0.001% | 0.07% | 0.32ppm | 0.01% |
| 29 | (0.0006% (0.001% | (0.0002% (0.0002% | 0.01% | 0.06ppm | 0.004% |

Good control of cabbage rootfly (*Hylemyia brassicae*) was obtained when the cabbage plants were treated with granules containing 5 percent of the compound of Example 17 or Example 18, used at the rate of 1 g. of granules per plant. Good control was also obtained by using a drench of 70 ml. of a dilution of the toxicant (a 25 percent emulsifiable concentrate diluted to contain 500 p.p.m. of toxicant). The compounds of Examples 6 and 12 also gave good control of cabbage rootfly.

I claim:

1. A compound selected from the group consisting of compounds of the formula

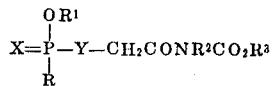

wherein
R and R¹ are lower alkyl or lower alkenyl;
R² is hydrogen or lower alkyl;
R³ is lower alkyl; and
X and Y are sulfur or oxygen.

2. The compound of claim 1 in which R, R¹, and R² are selected from the group consisting of methyl, ethyl, propyl, isopropyl, butyl, s-butyl, and allyl.
3. The compound of claim 1 wherein
R is methyl or ethyl;
R¹ is methyl, ethyl, n-propyl, or allyl;
R² is hydrogen, methyl, or ethyl, and
R³ is methyl or ethyl.
4. Compounds as claimed in claim 1 in which R, R¹, R² and R³ are chosen from the group consisting of methyl and ethyl.
5. Compounds as claimed in claim 1 in which X and Y are both sulphur atoms.
6. Compounds as claimed in claim 1 wherein said compound is S-(N-methoxycarbonyl-N-methylcarbamoylmethyl) dimethylphosphonothiolothionate.
7. Compounds as claimed in claim 1 wherein said compound is S-(N-methoxycarbonyl-N-methylcarbamoylmethyl) O-methyl ethylphosphonothiolothionate.
8. Compounds as claimed in claim 1 wherein said compound is S-(N-ethoxycarbonyl-N-methylcarbamoylmethyl) O-methyl ethylphosphonothiolothionate.
9. Compounds as claimed in claim 1 wherein said compound is S-(N-ethoxycarbonyl-N-methylcarbamoylmethyl) O-ethyl methylphosphonothiolothionate.
10. Compounds as claimed in claim 1 wherein said compound is S-(N-ethoxycarbonyl-N-methylcarbamolymethyl)diethyl-phosphonothiolothionate.
11. Compounds as claimed in claim 1 wherein said compound is S-(N-methoxycarbonyl-carbamoylmethyl) dimethylphosphonothiolothionate.
12. Compounds as claimed in claim 1 wherein said compound is S-(N-methoxycarbonyl-N-methylcarbamoyl-methyl) O-propyl ethylphosphonothiolothionate.
13. Compounds as claimed in claim 1 wherein said compound is (N-methoxycarbonyl-N-methylcarbamoylmethyl) O-ethyl methylphosphonothioate.
14. Compounds as claimed in claim 1 wherein said compound is S-(N-methoxycarbonyl-carbamoylmethyl) O-propyl methylphosphonothiolothionate.
15. Compounds as claimed in claim 1 wherein said compound is S-(N-methoxycarbonyl-N-methylcarbamoylmethyl) O-propyl methylphosphonothiolothionate.
16. Compounds as claimed in claim 1 wherein said compound is S-(N-methoxycarbonyl-N-methylcarbamoylmethyl) diethylphosphonothiolothionate.
17. Compounds as claimed in claim 1 wherein said compound is S-(N-Methoxy carbonyl-carbamoylmethyl) O-ethyl methylphosphonothiolothionate.

* * * * *